US012565095B2

(12) United States Patent
King et al.

(10) Patent No.: US 12,565,095 B2
(45) Date of Patent: Mar. 3, 2026

(54) TRANSMISSION WITH INTEGRATED ELECTRIC DRIVETRAIN

(71) Applicant: DEERE & COMPANY, Moline, IL (US)

(72) Inventors: Kevin R King, Bettendorf, IA (US); Curtis P. Thoreson, Janesville, IA (US); Joseph F. Lingle, Davenport, IA (US); Clayton P. Neumann, Cedar Falls, IA (US); Daniel P. Lipp, Fargo, ND (US); Clement V. Godbold, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 425 days.

(21) Appl. No.: 18/451,329

(22) Filed: Aug. 17, 2023

(65) Prior Publication Data

US 2024/0399848 A1 Dec. 5, 2024

Related U.S. Application Data

(60) Provisional application No. 63/505,728, filed on Jun. 2, 2023.

(51) Int. Cl.
*B60K 6/54* (2007.10)
*B60K 6/28* (2007.10)

(52) U.S. Cl.
CPC .................. *B60K 6/54* (2013.01); *B60K 6/28* (2013.01); *B60Y 2200/221* (2013.01); *B60Y 2306/03* (2013.01); *B60Y 2400/61* (2013.01)

(58) Field of Classification Search
CPC ... B60K 6/54; B60K 6/50; B60K 6/28; B60K 6/22; B60K 6/405; B60Y 2200/221;
(Continued)

(56) References Cited

U.S. PATENT DOCUMENTS

| | | | |
|---|---|---|---|
| 4,454,381 A | 6/1984 | Ito et al. | |
| 7,772,506 B2 | 8/2010 | Suter et al. | |

(Continued)

FOREIGN PATENT DOCUMENTS

| | | |
|---|---|---|
| CN | 104626953 B | 1/2018 |
| DE | 102019129043 A1 | 4/2020 |

(Continued)

OTHER PUBLICATIONS

Electrical Box Penetrations, https://buildingscience.com/documents/information-sheets/air-barriers-airtight-drywall-approach, accessed May 10, 2023, 1 page.
(Continued)

*Primary Examiner* — John D Walters

(57) ABSTRACT

A transmission for a work vehicle includes a transmission housing forming an enclosure for one or more transmission components, a reservoir in a lower portion of the transmission housing, the reservoir including transmission fluid, a first electric machine positioned within an upper portion of the transmission housing, an electronic component positioned at least partially within the reservoir, and a first busbar connected between the first electric machine and the electronic component. The first busbar includes a vertical portion extending from a location near the first electric machine to a location near the electronic component.

20 Claims, 9 Drawing Sheets

(58) Field of Classification Search
  CPC ............ B60Y 2306/03; B60Y 2400/61; F16H
                      57/0476; F16H 57/0467; F16H
                                          2057/02034
  See application file for complete search history.

(56)                    References Cited

U.S. PATENT DOCUMENTS

| | | | |
|---|---|---|---|
| 9,030,063 | B2 | 5/2015 | Rawlinson et al. |
| 9,543,069 | B2 | 1/2017 | Vafakhah et al. |
| 10,644,571 | B2 * | 5/2020 | Hatch ...................... H02K 5/20 |
| 10,948,070 | B2 | 3/2021 | Kuhl et al. |
| 11,420,512 | B2 * | 8/2022 | Worley ................. B60K 6/543 |
| 11,439,028 | B2 | 9/2022 | Atsumi et al. |
| 2018/0262089 | A1 | 9/2018 | Hatch |
| 2020/0144579 | A1 | 5/2020 | Narayanan et al. |
| 2021/0170857 | A1 | 6/2021 | Worley et al. |

FOREIGN PATENT DOCUMENTS

| | | | |
|---|---|---|---|
| DE | 102021128044 | A1 | 5/2022 |
| DE | 102023110970 | A1 | 1/2024 |

OTHER PUBLICATIONS

Air Sealed Electrical Box, https://basc.pnnl.gov/images?items_per_page=50&page=5, accessed on May 10, 2023, 1 page.
Electrical Wiring, https://basc.pnnl.gov/sites/default/files/images/TE513_electricalwiring2_BSCairbarrier_CV-PNNL_06-03-12.jpg, accessed May 10, 2023, 1 page.
German Search Report issued in application No. 102024101801.1 dated Sep. 25, 2024, 12 pages.

* cited by examiner

120

122

124

144
140

144

128

130

126

TRANSMISSION WITH INTEGRATED ELECTRIC DRIVETRAIN

CROSS-REFERENCE TO RELATED APPLICATIONS

This application claims the benefit of U.S. Provisional Application No. 63/505,728, filed Jun. 2, 2023, which is hereby incorporated by reference in its entirety.

FIELD OF THE DISCLOSURE

The present disclosure relates to a transmission with an integrated electric drivetrain.

BACKGROUND

Powertrains for work vehicles, such as those used in agriculture, construction, forestry, and other industries, can include internal combustion engines, electric motors, and continuously variable transmissions.

SUMMARY

According to an aspect of the present disclosure, a transmission for a work vehicle includes a transmission housing forming an enclosure for one or more transmission components, a reservoir in a lower portion of the transmission housing, the reservoir including transmission fluid, a first electric machine positioned within an upper portion of the transmission housing, an electronic component positioned at least partially within the reservoir, and a first busbar connected between the first electric machine and the electronic component. The first busbar includes a vertical portion extending from a location near the first electric machine to a location near the electronic component.

According to an aspect of the present disclosure, the transmission includes a second electric machine positioned within an upper portion of the transmission housing, and a second busbar connected between the second electric machine and the electronic component. The second busbar includes a vertical portion extending from a location near the second electric machine to a location near the electronic component.

According to an aspect of the present disclosure, transmission fluid from the first electric machine flows down the first busbar to the electronic component and into the reservoir.

According to an aspect of the present disclosure, the first busbar is a solid conductor busbar.

According to an aspect of the present disclosure, the electronic component is a power electronics device.

According to an aspect of the present disclosure, the electronic component is a motor drive which can provide one or more of inversion and active rectification.

According to an aspect of the present disclosure, the busbar includes a horizontal portion and an inclined portion.

According to an aspect of the present disclosure, the first electric machine is positioned above and over the electronic component.

According to an aspect of the present disclosure, the first electric machine is a motor-generator.

According to an aspect of the present disclosure, the transmission includes a conduit positioned between the electronic component and the transmission housing. The conduit includes a radial seal between the conduit and the transmission housing and an axial seal between the conduit and the electronic component. The conduit forms a sealed passageway from the electronic component to an exterior of the transmission housing.

According to an aspect of the present disclosure, a work vehicle includes the transmission.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
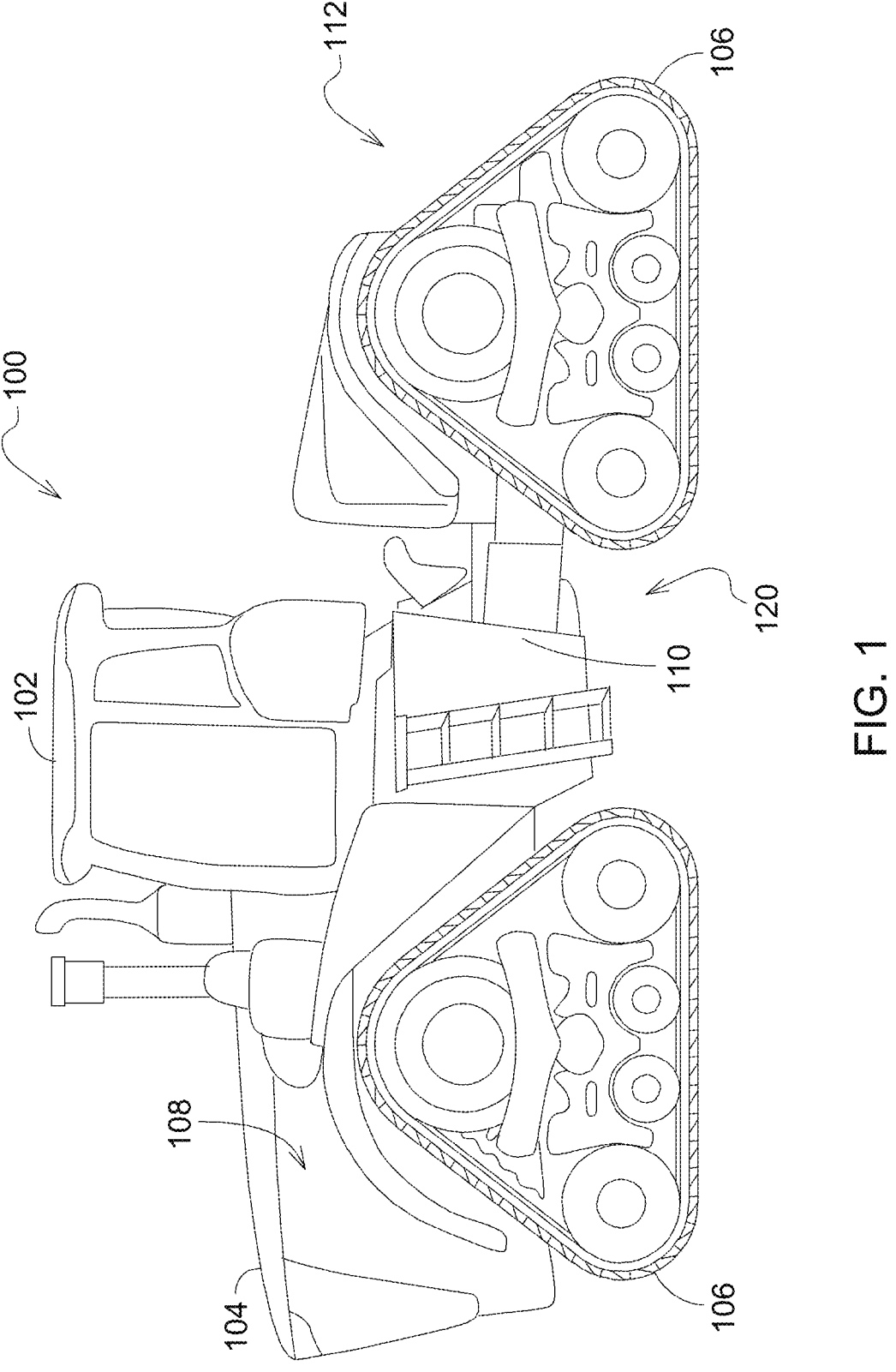
FIG. 1 is a perspective view of a work vehicle including a transmission, according to an implementation.
Figure 2:
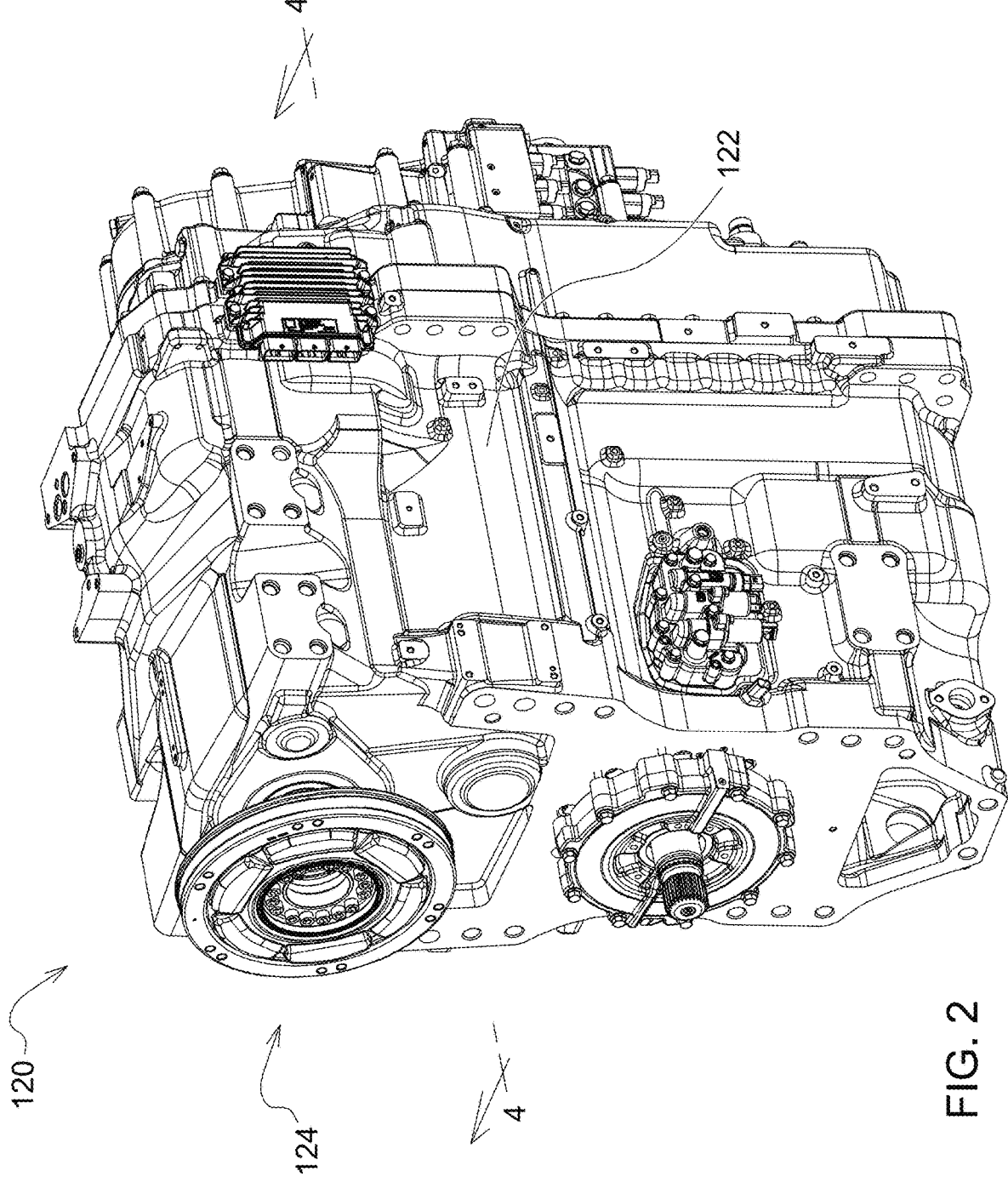
FIG. 2 is a perspective view of a transmission, according to an implementation.
Figure 3:
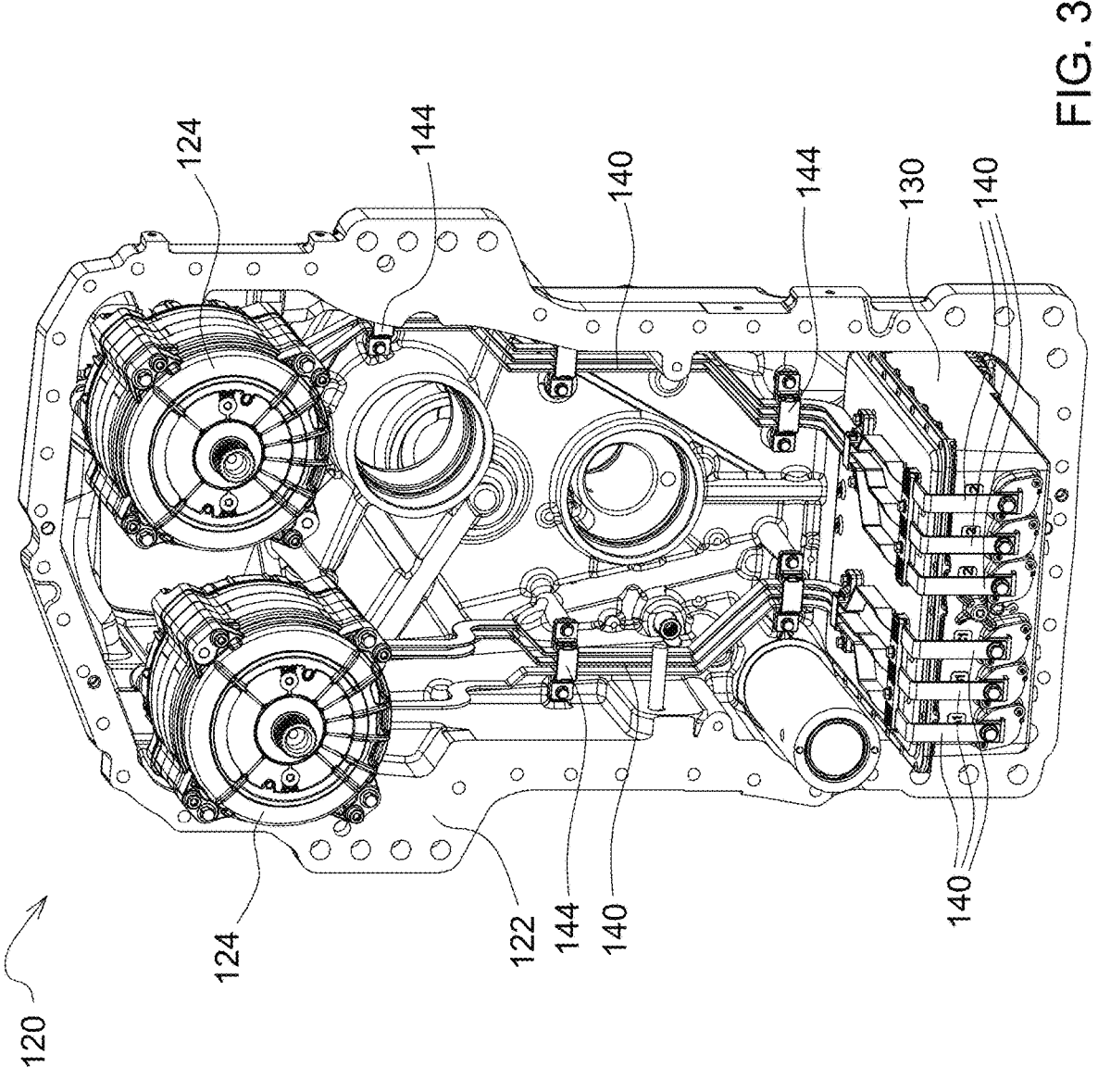
FIG. 3 is a partial cutaway view of a transmission, according to an implementation.
Figure 4:
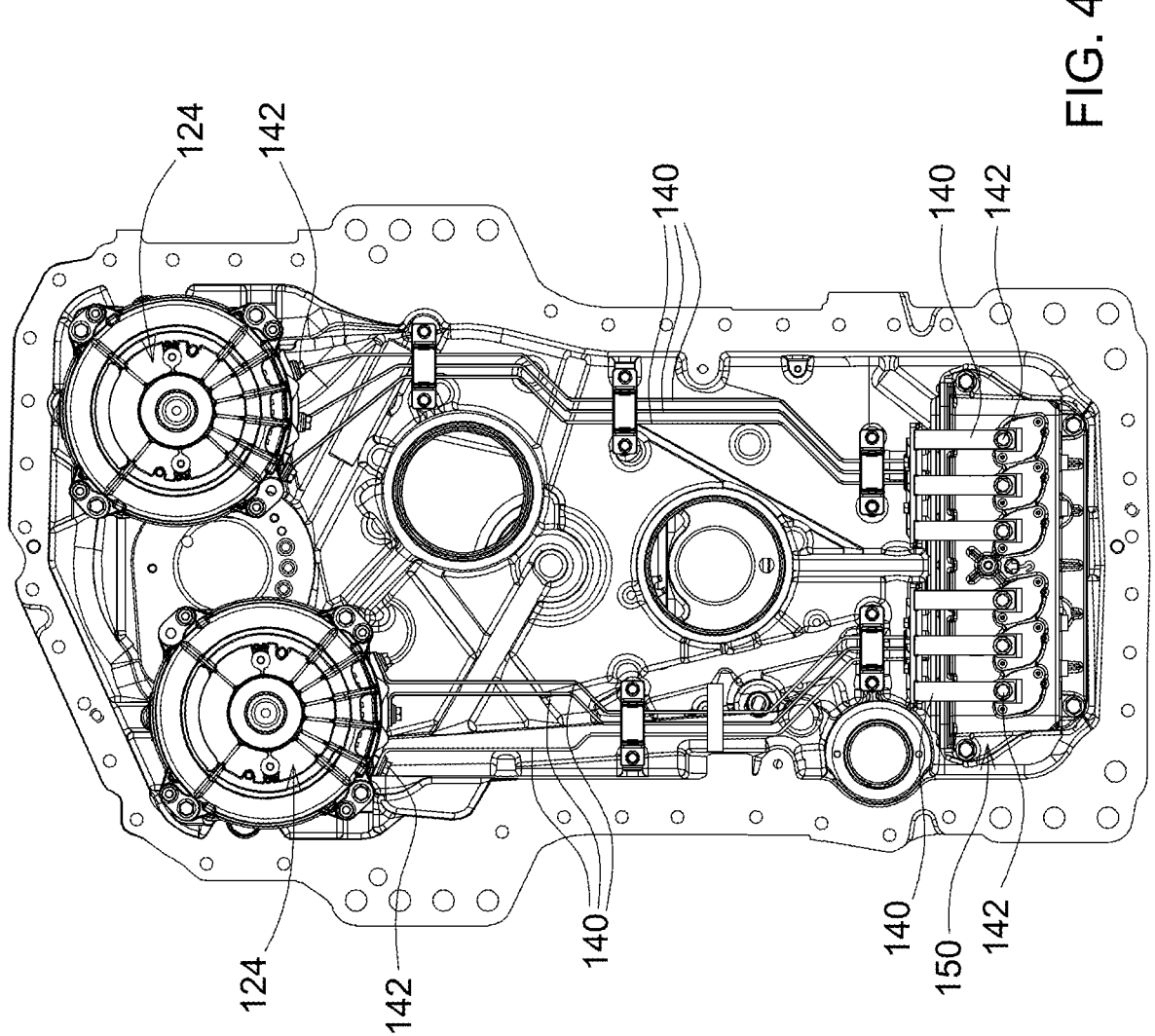
FIG. 4 is a partial cutaway view of a transmission, according to an implementation.
Figure 5:
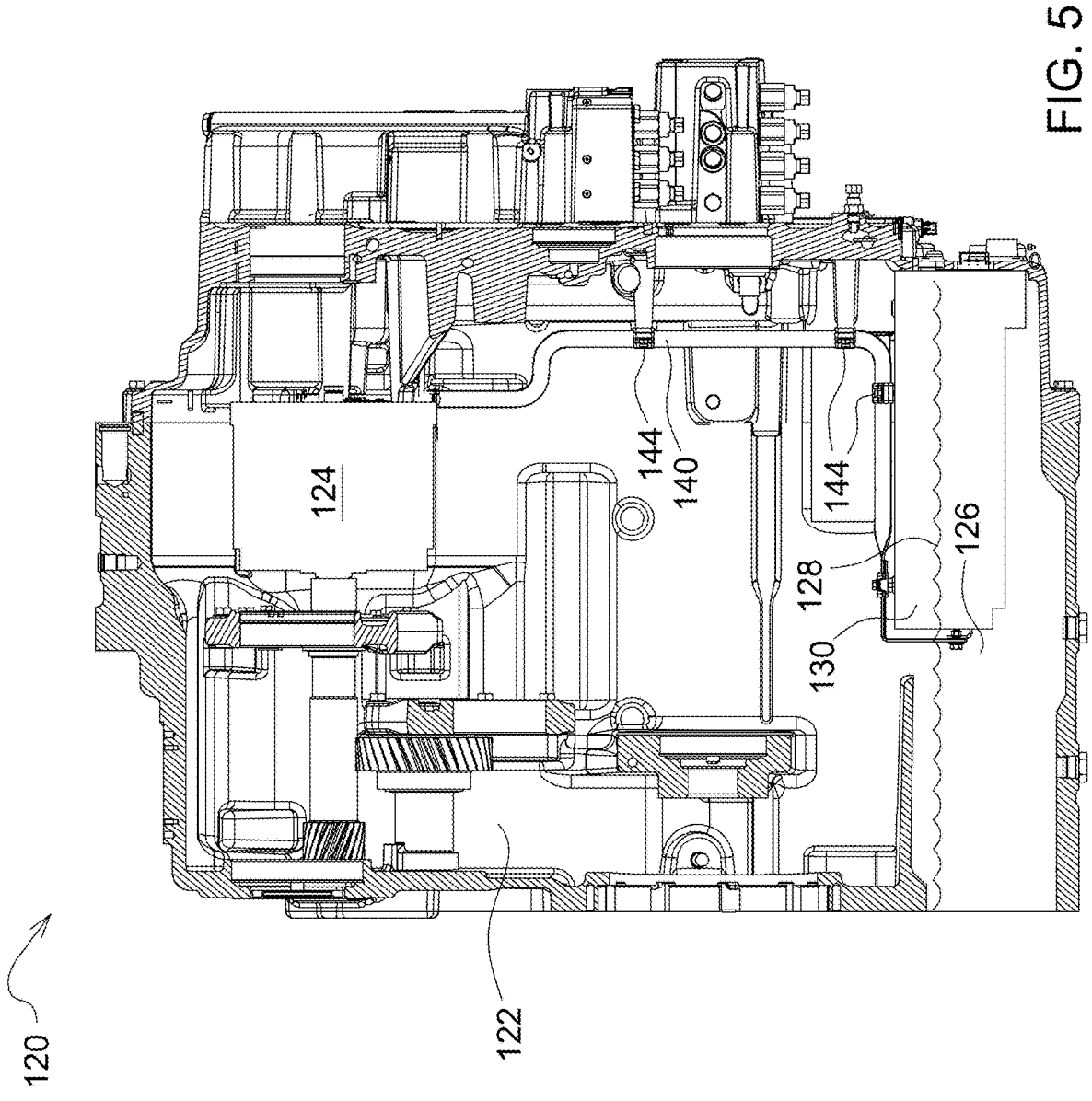
FIG. 5 is a partial cutaway view of a transmission housing, according to an implementation.
Figure 6:
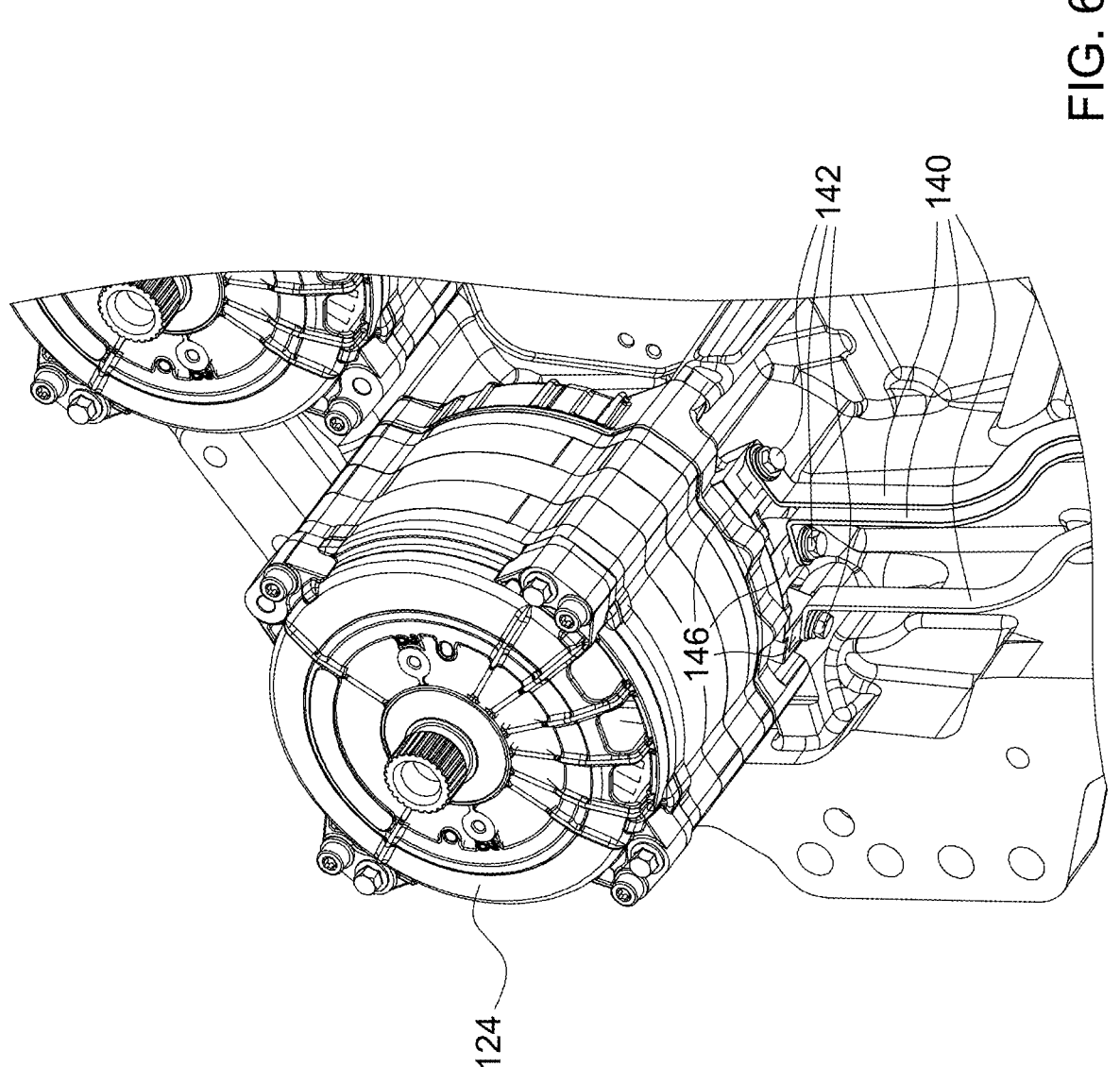
FIG. 6 is a perspective view of an electric machine, according to an implementation.
Figure 7:
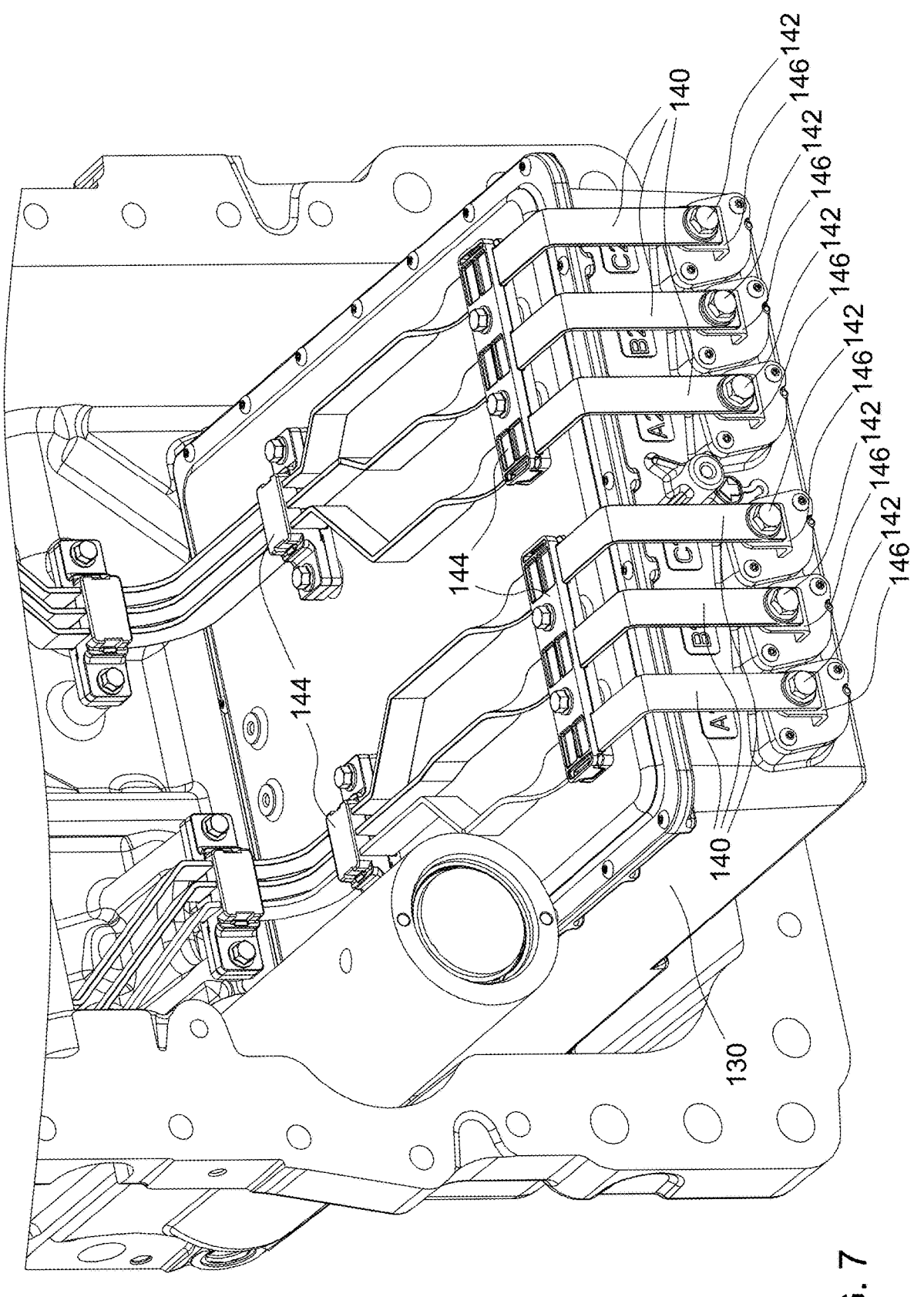
FIG. 7 is a perspective view of an electronic component, according to an implementation.
Figure 8:
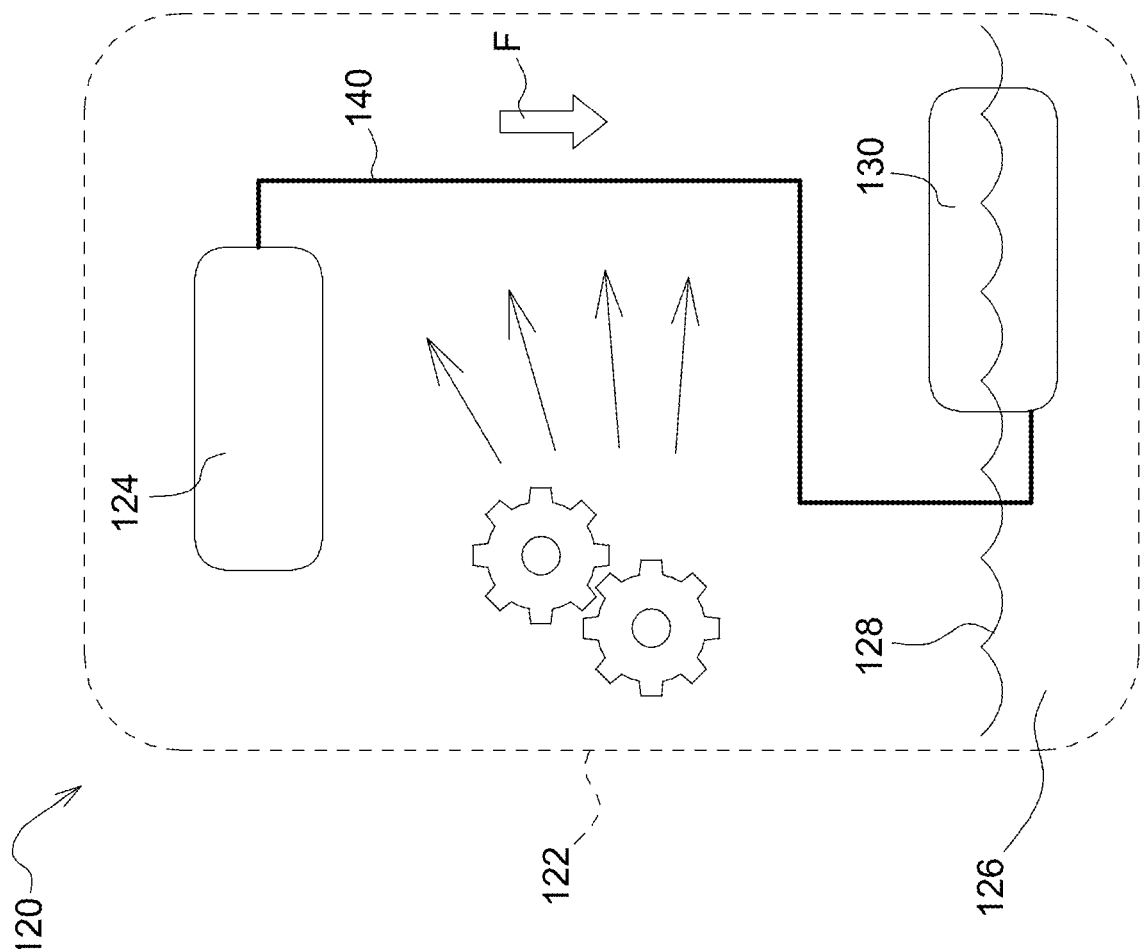
FIG. 8 is a schematic view of a transmission, according to an implementation.

With reference to FIG. 1, a work vehicle 100, for example an agricultural tractor, can include an operator station or cab 102, a hood 104, one or more ground engaging apparatus 106, for example wheels or track assemblies, and a frame or chassis 110. The work vehicle 100 can include an operator interface having any number and combination of electronic devices, such as an interactive display. The work vehicle 100 can have a rigid or an articulated frame 110. The work vehicle 100 can include one or more power sources 108, for example an internal combustion engine, a hybrid engine, or an electric or hydraulic machine. The work vehicle 100 can include a transmission 120 transferring power from the one or more power sources 108 to a drivetrain, which includes the ground engaging apparatus 106 and one or more power take off (PTO) shafts 112 or other auxiliary power outputs or inputs. This disclosure also applies to other types of work vehicles in agriculture, construction, forestry, and road building.

With reference to FIGS. 3-8, the transmission 120 can include a transmission housing 122, which provides an enclosure for the various transmission or other drivetrain components. The transmission housing 122 forms an exterior surface and an interior surface of the transmission 120.

The transmission 120 can include a plurality of shafts, gears, and clutches inside the transmission housing 122. One or more of the shafts or other transmission or drivetrain components may be rotatably connected to or supported by the transmission housing 122. The transmission 120 can include one or more electric machines 124, for example electric motor-generators, inside the transmission housing 122. A fluid reservoir or sump 126 is located or positioned in a lower portion of the transmission 122. The reservoir 126 can include a fluid, such as a hydraulic or transmission fluid. The reservoir 126 can include an approximate level or quantity 128 of fluid.

The transmission 120 can include one or more electric machines 124. A first electric machine 124 and a second electric machine 124 can be located or positioned within an upper portion of the transmission 120. The first and second electric machines 124, 124 can be connected or attached to the transmission housing 122. The first and second electric machines 124, 124 can be cooled with the hydraulic or transmission fluid. An electronic component 130, for example an inverter, a converter, or other power electronics devices, is located or positioned within a lower portion the transmission 120. In some implementations, the electronic component 130 is a motor drive which can provide inversion, active rectification, or both. The electronic component 130 can be positioned at least partially or entirely in the reservoir 126 of the transmission 120. The electronic component 130 is connected or attached to the transmission housing 122.

The first and second electric machines 124, 124 are located or positioned above the electronic component 130. The first and second electric machines 124, 124 can be located or positioned directly above or over the electronic component 130, as shown for example in FIGS. 3-5. One or more electric busbars 140 are connected between each of the first and second electric machines 124, 124 and the electronic component 130. Each of the one or more busbars 140 can be metal or metallic, for example copper, brass, or aluminum. Each of the busbars 140 can be solid or hollow conductors. The one or more busbars 140 can connect to the first and second electric machines 124, 124 and the electronic component 130 with fasteners 142, as shown for example in FIGS. 6 and 7. The one or more busbars 140 can connect to lugs 146 on the first and second electric machines 124, 124 and the electronic component 130. The fluid level 128 in the reservoir 126 can partially or completely cover the ends of the busbars 140 connected to the electronic component 130. The fluid level 128 in the reservoir 126 can partially or completely cover the lugs 146 of the electronic component 130. One or more supports 144 can connect to the one or more busbars 140. Each support 144 can connect one or more busbars 140 to the transmission housing 122 or the electronic component 130.

The one or more electric machines 124 can be located or positioned within a top portion of the transmission 120. The electronic component 130 can be located or positioned within a bottom portion of the transmission 120. The one or more busbars 140 can extend from the one or more electric machines 124 to the electronic component 130. The one or more busbars 140 can extend in a vertical or substantially vertical direction between the one or more electric machines 124 to the electronic component 130. The one or more busbars 140 can include one or more vertical portions, one or more horizontal portions, and one or more inclined or sloping portions. Each busbar 140 can include a variety of these portions in different arrangements, as shown for example in FIGS. 3-5. Hydraulic or transmission fluid flows into and out of the one or more electric machines 124. Some of the fluid flowing out of the one or more electric machines 124 can flow onto and down the one or more busbars 140. The various gears within the transmission 120 are lubricated with the hydraulic or transmission fluid. Some of the fluid can be thrown or propelled from the rotating gears onto the one or more busbars 140. The fluid then flows down the one or more busbars 140 towards the reservoir 126. The fluid flowing down the one or more busbars 140 can cool the one or more busbars 140.

Figures 9, 10, 11:
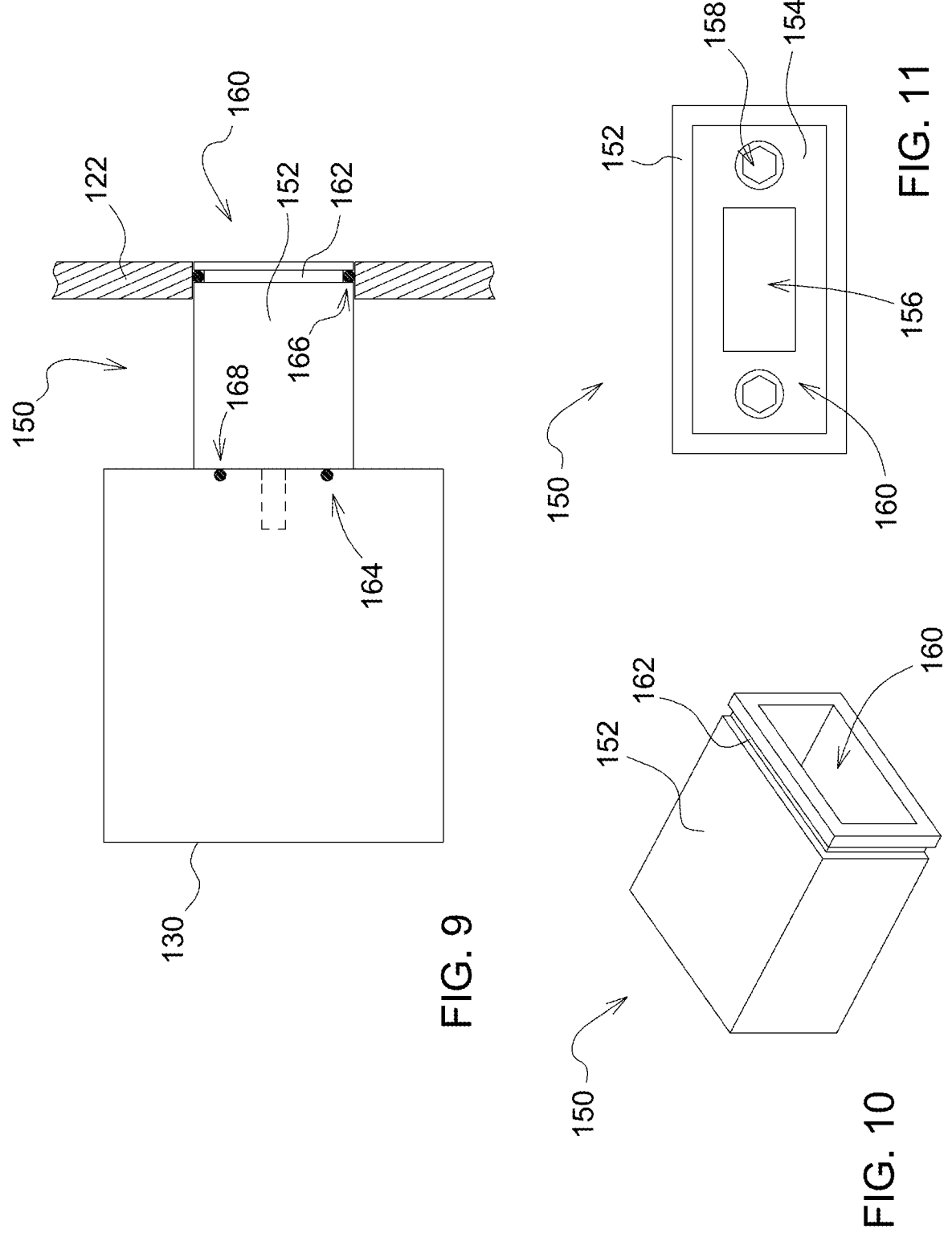
FIG. 9 is a top perspective view of a conduit, according to an implementation.
FIG. 10 is a perspective view of a conduit, according to an implementation.
FIG. 11 is a front perspective view of a conduit, according to an implementation.

With reference to FIGS. 9-11, a conduit 150 can be located inside the transmission 120 between the electronic component 130 and the transmission housing 122. The conduit 150 can include a side wall 150 forming a boundary of a passageway 160 and an end wall 154 having an opening 156. The conduit 150 can connect to the electronic component 130 via one or more fasteners 158. The conduit 150 can include a channel 162 for a radial seal 166 located or positioned between the conduit 150 and the transmission housing 122. An axial seal 168 can be located or positioned between the conduit 150 and the electronic component 130. The axial seal 168 can be located or positioned in a channel 164. The conduit 150 includes a sealed passageway or tunnel 160 from the electronic component 130 to an exterior of the transmission housing 122. One or more wires, e.g., a wire harness, can route through the passageway 160 from the exterior of the transmission 120 and connect to the electronic component 130 through the opening 156 in the end wall 154. The electronic component 130 can be spaced apart from the transmission housing 122 via the conduit 150. The electronic component 130 can be at various locations or positions within the transmission 120 with the use of the conduit 150.

During operation, electric current travels between the one or more electric machines 124 and the electronic component 130 via the one or more busbars 140. The electric current causes the busbars 140 to increase in temperature. The busbars 140 can be cooled by the air inside the transmission housing 122. In addition, the one or more busbars 140 can be cooled by the hydraulic or transmission fluid inside the transmission housing 122. Fluid at a lower temperature than the busbars 140 removes heat from the busbars 140. Without in any way limiting the scope, interpretation, or application of the claims appearing below, the one or more implementations described herein can include one or more of the following benefits: the use of busbars, the use of bolted lug high voltage connections, the use of unsealed motor generators, and more reuse of hydraulic or transmission fluid inside the transmission.

The terminology used herein is for the purpose of describing example embodiments or implementations and is not intended to be limiting of the disclosure. As used herein, the singular forms "a," "an." and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A transmission for a work vehicle, comprising:
a transmission housing forming an enclosure for one or more transmission components;
a reservoir in a lower portion of the transmission housing, the reservoir including transmission fluid;
a first electric machine positioned within an upper portion of the transmission housing;
an electronic component positioned at least partially within the reservoir; and
a first busbar connected between the first electric machine and the electronic component, the first busbar including a vertical portion extending from a location near the first electric machine to a location near the electronic component.

2. The transmission of claim 1, further comprising:
a second electric machine positioned within an upper portion of the transmission housing; and
a second busbar connected between the second electric machine and the electronic component, the second busbar including a vertical portion extending from a location near the second electric machine to a location near the electronic component.

3. The transmission of claim 1, wherein transmission fluid from the first electric machine flows down the first busbar to the electronic component and into the reservoir.

4. The transmission of claim 1, wherein the first busbar is a solid conductor busbar.

5. The transmission of claim 1, wherein the electronic component is a power electronics device.

6. The transmission of claim 1, wherein the electronic component is a motor drive which can provide one or more of inversion and active rectification.

7. The transmission of claim 1, wherein the busbar includes a horizontal portion and an inclined portion.

8. The transmission of claim 1, wherein the first electric machine is positioned above and over the electronic component.

9. The transmission of claim 1, wherein the first electric machine is a motor-generator.

10. The transmission of claim 1, further comprising:
a conduit positioned between the electronic component and the transmission housing, the conduit including a radial seal between the conduit and the transmission housing and an axial seal between the conduit and the electronic component, and the conduit forming a sealed passageway from the electronic component to an exterior of the transmission housing.

11. A work vehicle including a transmission, comprising:
a transmission housing forming an enclosure for one or more transmission components;
a reservoir in a lower portion of the transmission housing, the reservoir including transmission fluid;
a first electric machine positioned within an upper portion of the transmission housing;
an electronic component positioned at least partially within the reservoir; and
a first busbar connected between the first electric machine and the electronic component, the first busbar including a vertical portion extending from a location near the first electric machine to a location near the electronic component.

12. The work vehicle of claim 11, further comprising:
a second electric machine positioned within an upper portion of the transmission housing; and
a second busbar connected between the second electric machine and the electronic component, the second busbar including a vertical portion extending from a location near the second electric machine to a location near the electronic component.

13. The work vehicle of claim 11, wherein transmission fluid from the first electric machine flows down the first busbar to the electronic component and into the reservoir.

14. The work vehicle of claim 11, wherein the first busbar is a solid conductor busbar.

15. The work vehicle of claim 11, wherein the electronic component is a power electronics device.

16. The work vehicle of claim 11, wherein the electronic component is a motor drive which can provide one or more of inversion and active rectification.

17. The work vehicle of claim 11, wherein the busbar includes a horizontal portion and an inclined portion.

18. The work vehicle of claim 11, wherein the first electric machine is positioned above and over the electronic component.

19. The work vehicle of claim 11, wherein the first electric machine is a motor-generator.

20. The work vehicle of claim 11, further comprising:
a conduit positioned between the electronic component and the transmission housing, the conduit including a radial seal between the conduit and the transmission housing and an axial seal between the conduit and the electronic component, and the conduit forming a sealed passageway from the electronic component to an exterior of the transmission housing.

* * * * *